Figure 1:
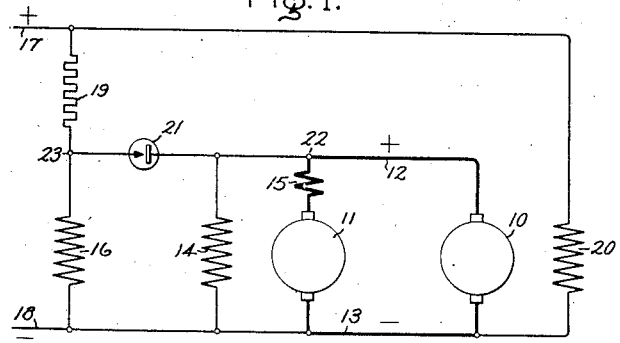

Aug. 17, 1937.   A. VALENTIN   2,090,584
CONTROL SYSTEM
Filed Oct. 26, 1936   2 Sheets-Sheet 1

Inventor:
André Valentin,
by Harry E. Dunham
His Attorney.

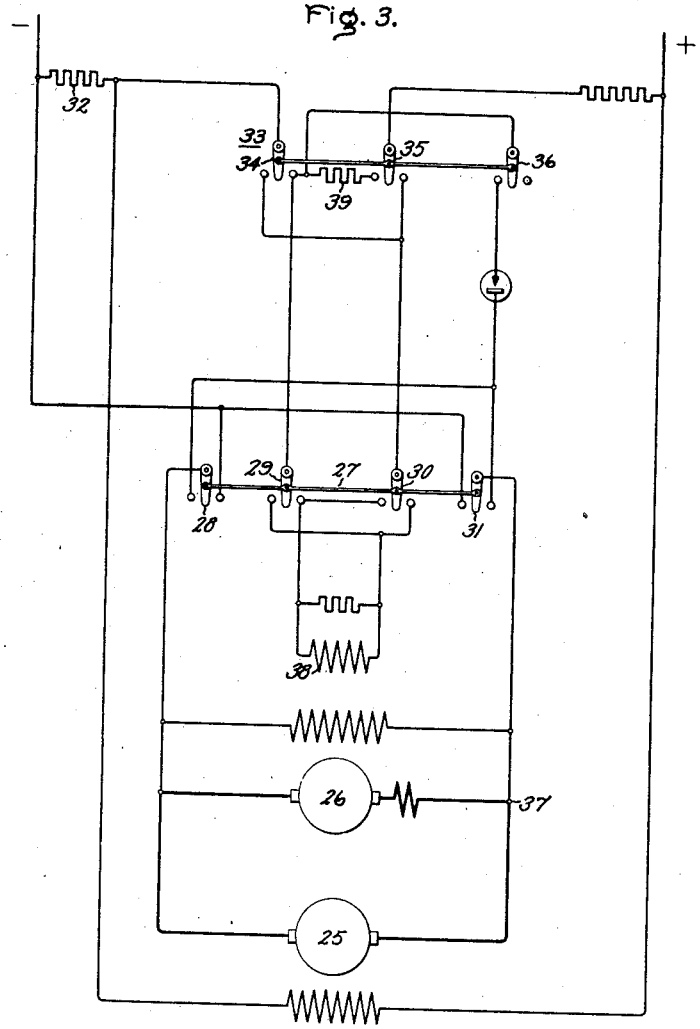

Patented Aug. 17, 1937

2,090,584

UNITED STATES PATENT OFFICE 2,090,584

CONTROL SYSTEM

Andre Valentin, Belfort, France, assignor to General Electric Company, a corporation of New York Application October 26, 1936, Serial No. 107,718
In France November 7, 1935

6 Claims. (Cl. 172—179)

This invention relates to control systems, more particularly to systems for controlling the braking of electric motors, and it has for an object the provision of a simple, reliable, and improved system of this character.

More specifically, this invention relates to control systems for stopping motors rapidly. One method that has been used for this purpose is known as reverse current braking or "plugging" and consists in reversing the driving torque of the motor by reversing its excitation or its armature current. This method as heretofore utilized has certain disadvantages because, if the motor circuit has not been interrupted when the motor comes to standstill, it will start again in the opposite direction.

The present invention avoids this disadvantage by automatically decreasing and annulling the reverse torque as the motor comes to standstill. In carrying the invention into effect in one form thereof, a circuit is connected in parallel with the circuit, the current of which produces or contributes to the production of the reverse driving torque, and a voltage varying with the counter voltage or speed of the braked motor is introduced in this parallel circuit so as to oppose the voltage of the circuit which produces or controls the braking torque. A rectifying device is included in the parallel connections for preventing the flow of current from the parallel circuit to the braking control circuit and allowing the flow of current in the reverse direction. At the beginning of the braking no current, or a negligible current flows through the parallel connection. However, as the braking progresses and the voltage in the parallel circuit decreases, the parallel connection bypasses an ever-increasing portion of the current of the braking control circuit, until it establishes practically a short circuit, while the part of the current flowing in the braking control circuit is reduced substantially to zero or to such a low value that the reverse driving torque will be insufficient to start the motor in the reverse direction.

The invention has general application regardless of the method of supplying the motors which are to be braked. It is applicable for example, to motors that are supplied from a network. It is also applicable to motors that are supplied from special generators, especially Ward Leonard generators, and particularly in the case of motors fed from constant-current or limited current-type generators, the latter motors being especially applicable to regenerative braking.

The parallel connection, by means of which the annulment of the reversed driving torque is to be established, when the motor comes to a standstill, can be applied either to the field circuit of the motor or to its armature circuit or, in the case of motors supplied by one or more special generators, to the field circuits of said generators or to the field circuits of their separate exciter, etc. This parallel connection may be applied at the very beginning of the braking operation, or only during the latter part of the braking operation; it may comprise any appropriate type of regulation, manual or automatic. The opposing electromotive force which varies with the counter voltage of the motor may be either the counter voltage itself or that of a generator excited by means of the counter voltage. This opposing voltage may also be generated by a generator or tachometer-type magneto which is mechanically driven by the motor, or it may be any other appropriate voltage varying with the counter voltage or speed of the motor. The rectifying device in the parallel connection may be a dry rectifier, an electric valve, an arc apparatus, etc.

Figure 2:
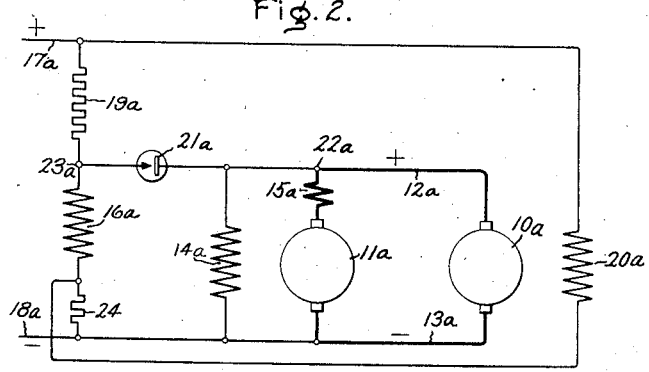
Figure 4:
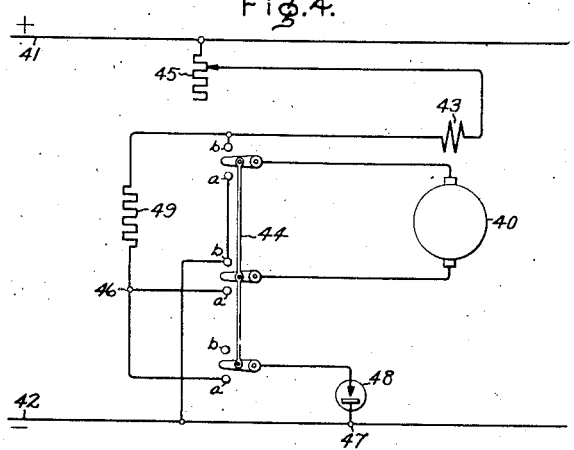

For a better and more complete understanding of the invention, reference should now be had to the following specification and to the accompanying drawings in which Fig. 1 is a simple schematic diagram of an embodiment of the invention; Fig. 2 is a schematic diagram of a modification; Fig. 3 is a schematic diagram of a reversing system in which the invention has been embodied; and Fig. 4 is a schematic diagram illustrating an application of the invention to a series type motor.

Referring now to the drawings, the armature 10 of a motor is supplied from a generator to whose armature 11 the motor is connected by means of conductors 12, 13. The generator is illustrated as a constant-current characteristic generator. It has a self-excited field winding 14, a series differential field winding 15, and a separately excited winding 16. Winding 16 is supplied from a suitable source, represented by supply lines 17, 18 to which it is connected through a resistance 19. Field winding 20 of motor 10 is also supplied from source 17, 18.

The connections of Fig. 1 are assumed to be those of the reverse current braking scheme, that is to say the direction of the current in winding 16 is that in which the voltage generated by the generator 11 would be added to the voltage generated by motor 10 if it were not for the fact that the reverse current in winding 15 compels the generator to maintain the same voltage polarity as existed prior to the establishment of the braking connections. In conformity with the invention, a circuit which shunts the winding 16 is established by connecting respectively, the two terminals of that winding with both armature terminals of generator 11 or of motor 10. A rectifying device 21 such for example as a dry rectifier is included in the connections between the positive terminals of the winding 16 and the armature of generator 11 in such a way that it opposes flow of current in the direction from the positive terminal 22 of generator 11 and motor 10 toward the positive terminal 23 of winding 16. Preferably, a rectifier having a relatively low voltage drop is selected.

It is also assumed that after the reversal of winding 16 to initiate the reverse current braking, the voltage applied to the terminals of that winding is only a fraction, for example 10 per cent, of the voltage at the terminals of motor 10. This is a value often approximately encountered in practice. Under these conditions, the potential of terminal 22 is first much higher than that at terminal 23, but the rectifier prevents current from flowing from terminal 22 to terminal 23 and the reverse current braking exerts its full force.

But, as the speed of motor 10 decreases, the voltage of terminal 22 decreases below that of terminal 23. The current taken from source 17, 18, which passes through the resistance 19, divides, and a portion of it flows through the parallel connection and through winding 16, and armatures 10 and 11. As the voltage of motor 10 decreases with decreasing speed of the motor, an increasing portion of that current is by-passed by the parallel connection. The current in winding 16 decreases as the current in the parallel circuit increases and the counter voltage of the generator 11 which is now operating as a motor will oppose the voltage of the motor. This in turn brings about a gradual reduction of the reverse braking current.

When motor 10 stops, the parallel connection applied to the winding 16 becomes practically equivalent to a short circuit if the rectifying device 21 has a sufficiently low voltage drop. Hence the current flowing through winding 16, the voltage applied by generator 11 and the reversed torque of motor 10 decrease substantially to zero and the motor cannot start again in the opposite direction and remains thus stationary.

If a rectifying device having a substantial voltage drop were employed there still would remain, after stopping the motor, a torque of a certain value.

In order to annul this residual torque, the generator 11 may be provided with a small excitation winding which is connected in series with resistance 19 and ahead of the taps for the parallel connection 23, 22. This auxiliary winding is connected so that its magnetization opposes the magnetization of winding 16 and offsets the residual ampere turns of the latter.

This residual torque can also be eliminated by the arrangement shown in Fig. 2 in which a resistance 24 is connected between the lower terminal of the separately excited winding and the lower side of the excitation circuit so that it is traversed by the excitation current of the motor. The remaining elements of this modification are identical with corresponding elements of Fig. 1 and are, therefore, designated by the same reference characters with the subscript *a* added.

The constants of the circuits are so chosen that the voltage drop across the resistance 24 produced by the excitation current of the motor will exactly compensate the voltage drop across the terminals of the rectifier. The result will be that the rectifying device will pass a current, but when the motor comes to rest, the voltage drop across resistance 24 will be equal to the voltage drop across the rectifying device 21*a* to the lower supply line 18*a*. Consequently, the voltage at the upper terminal of resistance 24 will be equal to the voltage at terminal 23*a* and no current will flow in the field winding 16*a* and the motor cannot start in the reverse direction.

In the modification of Fig. 3, motor 25 is supplied by a substantially constant current generator 26 and means in the form of a switching device 27 are provided for reversing operation. The switch member carrying the movable contacts 28, 29, 30 and 31 is actuated to its right hand position for rotation of the motor in the forward direction and is actuated to its left-hand position for rotation in the reverse direction. This modification also embodies a resistance 32 that performs the same function as the resistance 24 in Fig. 2.

In addition, a three pole switch 33 having movable contacts 34, 35, and 36 is provided for establishing the reverse current braking connections. For normal operation of the motor switch 33 is actuated to its right hand position for motoring operation and to its left hand position for reverse current braking operation. When switch 27 is in its right hand position the parallel connection between the positive terminal 37 of the motor 25 and generator 26 and the positive terminal of the separately excited field winding 38 is open. A discharge resistor 39 for field winding 38 is provided.

If the switch 27 is in one of its positions and the motor 25 rotating in a corresponding direction and the switch 27 is actuated to the opposite position, counter current braking is produced and the motor is brought to rest. However, after the motor has come to rest it will start in the reverse direction.

In order to prevent the motor from reversing after having been braked to standstill, the switch 33 is moved from its right-hand position to its left-hand position. The operation is then similar to that of the modification of Fig. 2 irrespectively of whether the switch 27 is in the forward position or in the reverse position. Resistance 39 may then be utilized for limiting the reverse current which is flowing through the winding 38 at the beginning of the braking operation.

The reversing switch 27 may be actuated while the changeover switch 33 is in its running position. It can evidently be also actuated while the changeover switch is in its left-hand or braking position provided motor 25 is stopped; however, if motor 25 has not come to a stop, the initial direction of braking is retained but the current is much more intensive and this produces a very violent braking effect. Normally, the last-mentioned maneuver should be avoided. However, it may be useful in emergencies.

It must be noted that even in the case of a load which travels down-grade by gravity, and the speed of which is limited through regeneration and through reverse current, the use of the mechanical brake is not necessary. It suffices to move the controller lever to the stop position slightly before the end of the run. This will produce an energetic braking that will permit only a very slight final velocity which may be regulated at will by means of resistance 32. This slight velocity will make it possible to come to a stop without any impact at the end of the run.

In the modification of Fig. 4 a series motor 40 is supplied from a source 41, 42. The motor has a series field 43. A three-pole switch 44, having two positions a and b provides in position b, the running connections of the motor and in position a the connections required for the reverse current braking. A starting resistance 45 is also provided.

In accordance with the invention, there is applied to the armature of the motor, while the latter is being braked, a parallel connection 46, 47 in which there is connected a rectifying device 48 which is so connected that it will conduct current only in the direction from 46 to 47. A braking resistance 49 is connected in series with the armature 40.

The voltage generated by the motor will oppose the voltage supplied from the source to the connection 46, 47. The current which is by-passed in that connection as soon as it has the direction from 46 to 47 increases with the deceleration of the motor. At standstill the connection 46, 47 practically short circuits the armature 40 thus preventing any restarting of the motor in the opposite direction. The braking resistance 49 limits the current taken from the network.

Although in accordance with the provisions of the patent statutes, this invention is described as embodied in concrete form it will be understood that the apparatus and connections shown and described are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination, an electric motor, a circuit for controlling the torque of said motor, means for controlling the direction of the current in said circuit to produce a torque for braking said motor, a circuit connected in parallel with said control circuit, means for producing in said parallel circuit a voltage opposing the voltage of said control circuit and varying with the speed of said motor thereby progressively to short circuit said control circuit as said motor is braked, and rectifying means in said parallel connected circuit to prevent the voltage thereof from causing current flow in said control circuit.

2. A control system comprising in combination an electric motor, a circuit including a winding for controlling the torque of said motor, means for controlling the direction of the current in said winding to produce a torque for braking said motor, a circuit connected in parallel with said winding, means for producing in said parallel circuit a voltage opposing the voltage of said control circuit and varying with the speed of said motor to provide for progressive deenergization of said winding as the speed of said motor decreases and a rectifying device in said parallel circuit for preventing the flow of current from said parallel circuit to said winding.

3. A control system comprising in combination, an electric motor, a winding for controlling the torque of said motor, means for controlling the direction of current in said winding to produce a torque for braking said motor, a connection for paralleling said winding with the armature of said motor with the voltage of said armature opposing the voltage of said winding, and a rectifying device included in said connection providing for flow of current from said winding to said armature thereby gradually to deenergize said winding as said motor decelerates.

4. A control system comprising in combination, an electric motor, a generator for supplying said motor, said generator having a field winding, means for controlling the direction of current in said winding to produce a torque for braking said motor, means for connecting the armature of said motor in parallel with said field winding with the voltage of said armature opposed to the voltage of said winding, and rectifying means included in said connecting means preventing flow of current from said motor to said winding and providing for flow of current from said winding to said motor thereby to provide gradual deenergization of said field winding as said motor is braked to rest.

5. A control system comprising in combination, an electric motor, a generator for supplying said motor having a separately excited field winding, means for controlling the direction of the current in said winding to produce a torque for braking said motor, a connection between points of like polarity in said field circuit and the armature circuit of said motor, and a rectifying device in said connection to prevent current flow from said motor armature to said field winding and to provide for current flow in the reverse direction thereby to provide deenergization of said winding in accordance with the progress of the braking of said motor.

6. A control system comprising in combination, a direct current electric motor, a substantially constant current supply generator for said motor having a separately excited field winding, a self-excited field winding and a series differential field winding, a switch for reversing the excitation of said separately excited winding to control the direction of rotation of said motor, a second switch for controlling the excitation of said separately excited winding to produce a torque for braking said motor, said second switch also serving to establish parallel connections between said separately excited field winding and the armatures of said motor and generator with the voltages of said armatures opposed to the voltage of the circuit of said winding, and a rectifying device included in said connections for preventing current flow from said armatures to the circuit of said winding and providing increasing flow of current from said circuit to said armatures thereby to deenergize said winding in accordance with the progress of the braking of said motor.

ANDRE VALENTIN.